Sept. 15, 1970   L. G. SIMJIAN   3,528,177
INVENTORY SYSTEM
Filed Feb. 12, 1968

LUTHER G. SIMJIAN
*INVENTOR.*

BY Ervin B. Steinberg
AGENT.

the trade. Alternatively, the unit 30 may be replaced by an optical scanning unit which senses the display provided
United States Patent Office 3,528,177
Patented Sept. 15, 1970

3,528,177
INVENTORY SYSTEM
Luther G. Simjian, Greenwich, Conn., assignor to General Research, Inc., Greenwich, Conn., a corporation of Connecticut
Filed Feb. 12, 1968, Ser. No. 704,626
Int. Cl. G01b 5/04
U.S. Cl. 33—129
11 Claims

ABSTRACT OF THE DISCLOSURE

An inventory system for use with dispensable material from bulk comprises a measuring device for measuring the quantity of material dispensed and is operable for dispensing material only when a check provided with data identifying the material is engaged by it. Sensing means sense the material identifying data provided on the check and the quantity of material dispensed, as available from a counter, and transmit such data to a remote computer for inventory maintenance purposes.

---

This invention generally relates to an inventory system for use with dispensable material which is normally stored in bulk form. More specifically, this invention has reference to a dispensing means for indicating the quantity of material dispensed from bulk and such dispensing means being coupled to a remote record means, e.g. a computer, for maintaining an inventory of the material still remaining in bulk form or, conversely, of the total material dispensed.

The instant invention is related to my previously issued U.S. Letters Patent No. 2,832,146 dated Apr. 29, 1958 and No. 2,902,767 dated Sept. 8, 1959, both entitled "Inventory System."

In the patents identified hereinabove, I have described an inventory system wherein a dispensing device is used to engage material to be dispensed and, as the material is drawn through the device, certain means provided indicate the amount of material dispensed while respectively a counter or a tabulating card associated with the bulk material indicates the quantity of material still remaining in bulk form. For instance, when dispensing textile material from a bolt, a digital counter or a tabulating card associated with the bolt indicates at a glance the quantity of material still remaining on the bolt. In this way it is readily possible to take an inventory of the quantity of material remaining on the bolt and it is no longer necessary to unwind the material from the bolt in order to measure the precise quantity or length of material still remaining. The same device, with certain modifications, may be used for dispensing other materials from bulk such as sand, cement, coal or liquids, whereby the quantity dispensed is metered or weighed, and a counter or a record card engaged by the dispensing device is adjusted accordingly.

The present invention concerns an arrangement wherein the inventory is maintained at a remote location, such as a central station, and a modern electronic computing means is used for such inventory purposes. In this manner, a much larger quantity of materials may be inventoried and the material available in many stores and at different locations can readily be supervised and reordered. Moreover, minimum reordering levels may be established and the computer can be used to automatically provide reordering requisitions on time and with a minimum of supervision.

One of the important objects of this invention is, therefore, the provision of a new and novel dispensing apparatus associated with a remotely disposed inventory maintenance means.

Another important object of this invention is the provision of an inventory system for dispensing material from bulk, the system providing data as to the amount of material dispensed and including signalling means for transmitting such data to a computing means.

Another and further object of this invention is the provision of a system for dispensing material from bulk, including means for precluding operation of the dispensing means in the absence of a check means carrying material identifying data, and including means for determining the amount of material dispensed and means for signalling data corresponding to the particular material and quantity dispensed to a remote computer.

A further and still other important object of this invention is the provision of a modern system for inventorying material and maintaining control over a large quantity of different materials dispensable from bulk.

Further and still other objects of this invention will become more clearly apparent by reference to the following description when taken in conjunction with the accompanying drawings in which.

General description

Figure 1:
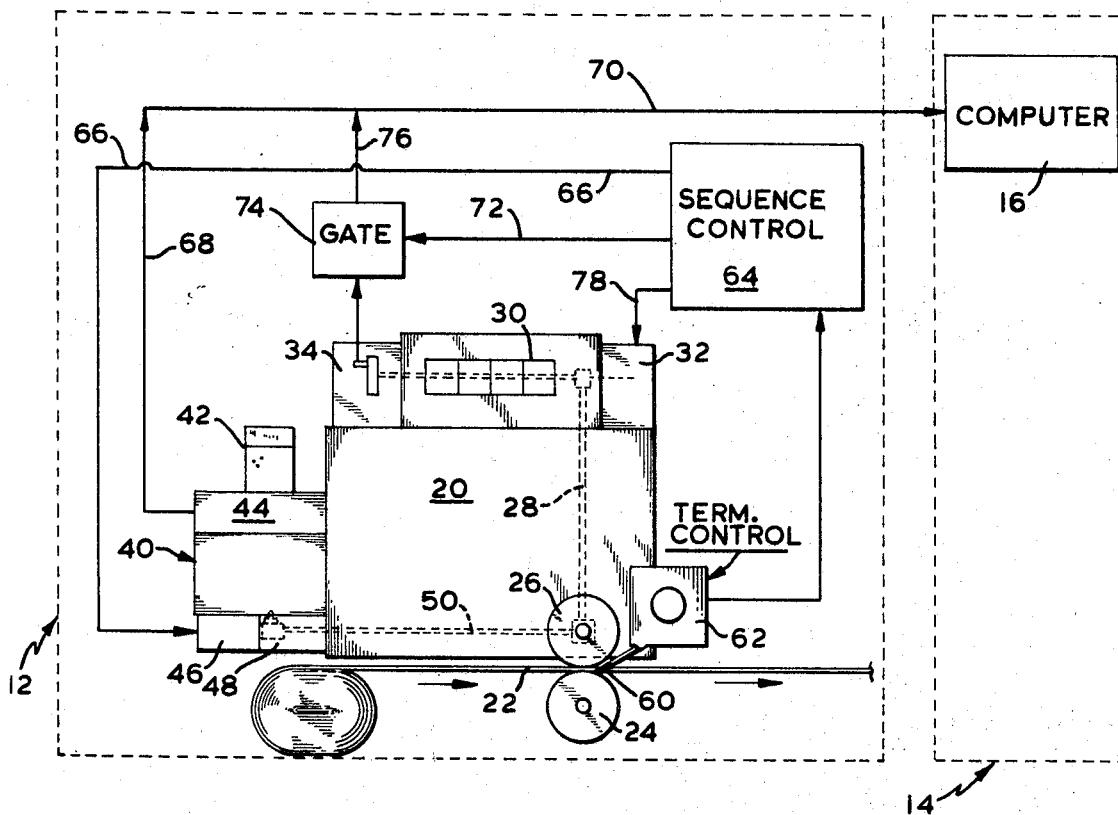
FIG. 1 is a schematic block diagram showing substantially all of the important elements of the system.

Referring now to FIG. 1, numeral 12 refers to a local material dispensing station and numeral 14 identifies a remotely disposed record station. The record station 14 is provided, among other things, with a computer 16, also known as an electronic data processing unit (E.D.P.), which, according to a preferred embodiment of the present invention, comprises a modern digital computing system, such as a digital electronic computer available from the International Business Machines Corporation, Sperry Rand Corporation, Burroughs Corporation, etc. The computer may process the data either on an "on-line" basis, or, more economically, the information transmitted to the computer may be stored and processed at a later date, known as "off-line" processing. These terms are well understood by those skilled in the art and do not require further explanation.

At the local station there is disposed a dispensing means 20 through which material to be dispensed passes. Such a dispensing means is shown in greater detail in U.S. Pat. No. 2,832,146 supra. When dispensing material, such as textile cloth 22 which is unwound from a bolt, the material 22 is passed between two measuring rollers 24 and 26. As the roller 26 rotates in proportion to the amount of material drawn therethrough, a shaft 28 transmits rotational information corresponding to the length of the material dispensed to a digital counter 30 which displays data, for instance numerals, indicative of the length of material passed through the rollers. The counter 30 is provided also with an electrical reset or zeroizing control 32, for instance a solenoid for resetting the counter 30 to a zero position after each dispensing operation. Additionally, the counter 30 is provided with an electronic read-out assembly 34 comprising essentially a rotatable disk having discrete markings and a brush assembly in contact with the markings for reading out, by electrical means, signals corresponding to the setting of the counter 30. A counter of this type is known as an analog to digital converter and units of this type are readily available in the trade. Alternatively, the unit 30 may be replaced by an optical scanning unit which senses the display provided by the counter and provides electrical signals in response to such display.

Figure 2:
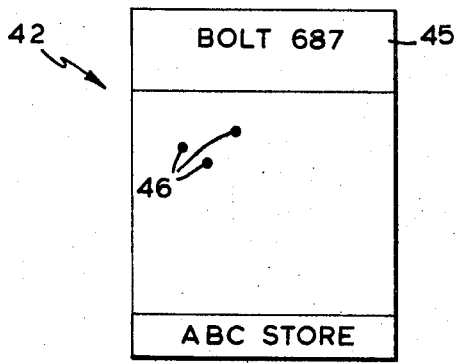
FIG. 2 is a plan view of a typical check means necessary for causing operation of a particular dispensing means.

Attached to the dispensing means 20 there is a check receiving unit 40 which is adapted to receive a check, such as a flat record card 42 shown more clearly in FIG. 2. The card 42 has printed thereon, for instance a material identification, such as the one shown by numeral 45, and the same information being repeated in code form, for instance punched holes 46 positioned in binary form. A bolt carrying textile material, or each distinct material to be dispensed, is associated with a respective check means, such as this card. The record card may carry additional data, e.g. the stock and style number of the material, date ordered, minimum quantity, unit price and the like, as is well known to those skilled in the art. The check receiving means 40 and the check 42, typically, are of the type as used in the Western Electric telephone card dialing system wherein a card carrying punched telephone number data is inserted into a receiving slot and, as the card is driven upward, a sensing mechanism 44 senses the punched holes in the card and sends electrical signals responsive to such data to a remote location.

The check receiving means 40, as shown in FIG. 1, is equipped with two further items, one being a release mechanism 46 which is adapted to maintain the card 42 locked in the check receiving means 40 until such time as a suitable signal actuates the release mechanism 46, at which time the card is driven upward past the sensing mechanism 44 and is ejected. The other mechanism is an interlock 48 coupled via a mechanical or electrical coupling 50 to the roller 26. The interlock 48 prevents the operation of the roller 26 in the absence of a check 44 being firmly disposed in the check receiving means 40. Hence, in order that the dispensing means be rendered operative, it is necessary that a card 42 providing data with respect to the material dispensed is engaged by the check receiving means 40.

Operation

Operation of the foregoing mechanism may readily be visualized as follows: In order to dispense material, such as textile material, a bolt of the suitable material and provided with a record card, such as card 42, is brought from stock to the dispensing means 20. The card 42 is removed from the bolt and is inserted into the check receiving means 40 associated with the dispensing means. This check receiving means 40 may either be a part of the dispensing means 20 or be a separate unit electrically interconnected and disposed at a convenient place. Full insertion of the check 42 into the unit 40 actuates the interlock 48, thereby releasing the measuring roller 26, rendering it operative for measuring material fed therethrough. Material 22 to be dispensed is now passed between the rollers 24 and 26 and the counter 30 is actuated to indicate the amount of material drawn therethrough, for instance a quantity of six yards, six inches. A cutoff knife 60 is coupled to a control means 62 to provide a signal when a particular dispensing operation is terminated, as by cutting off the six yards, six inches just drawn through the measuring roller. Alternatively, a separate pushbutton switch may be provided to indicate termination of a particular dispensing operation.

Upon signalling the termination of such a dispensing operation, as by operating the cutoff knife 60 or actuating a separate push-button associated with the control means 62, an electrical signal is sent to a sequence control means 64, causing actuation thereof. The sequence control means 64 sends via a conductor 66 a signal to the release mechanism 46 which releases the check means, i.e. record card 42. As the record card is driven upward, by a suitable mechanism (not shown), the interlock 48 is operated and the roller 26 is locked to preclude further operation thereof. As the card 42 is driven upward the various holes punched in the card are sensed by the sensing unit 44 and the material identifying data as recorded on the card are transmitted via the conductors 68 and 70 to the computer 16. As soon as the material identifying data have been transmitted, the sequence control means 64 via conductor 72 sends a signal to the gate 74 which now receives electrical signals from the digital unit 34, and the gate transmits the data corresponding to the quantity of material dispensed via the conductors 76 and 70 to the computer 16. Finally, when both, the data from the record card providing material information, and the data from the counter unit 30 indicating data with respect to the quantity of material dispensed, have been sensed and transmitted to the computer 16, the sequence control unit 64 via conductor 78 provides a signal to the zeroizing unit 32 to reset the counter 30, thereby normalizing the counter.

In order to proceed with the dispensing of further material, or to dispense a new material, it will be necessary to insert a respective check associated with the material to be dispensed in the check receiving means 40 and a new dispensing operation may be started.

Alternative construction

Figure 3:
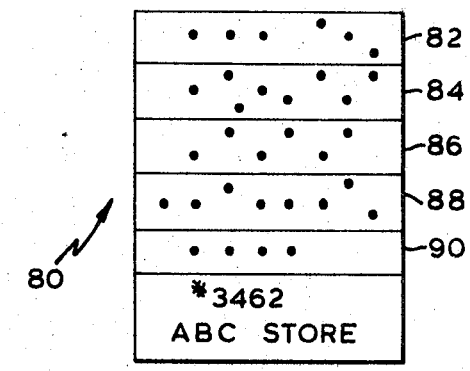
FIG. 3 is a plan view of another check means which is adapted to cause, by means of certain codes, a prescribed sequence of operations.

FIG. 3 shows a slightly modified arrangement wherein the record card 80 is used and coded to provide some of the functions of the sequence control unit 64. For instance the top block of information 82 comprises the start signal to the computer and signals location information, etc. The block 84 comprises the material information which is read into the computer. The block 86 comprises a command signal to read the amount of material dispensed as available from the counter 30, and the block 88 comprises code for zeroizing the counter 30. Finally, the block 90 could signal to the computer the end of operation, or the end of the data transmitted from this particular location. The controlling of computers by means of such coded data is well understood. In this connection, reference is made to a record card as shown in "Machine Design" magazine, Dec. 21, 1967, p. 26.

Finally, it will be apparent that the above device and arrangement may readily be used for other materials, such as dispensing liquids from bulk whereby the roller 26 would comprise a unit rotating in response to the amount of liquid flowing through a measuring pipe. In still other applications, when dispensing sand, grain, etc. again a rotating, or otherwise displaceable measuring or weighing device may be used to determine the quantity of material separated from bulk and dispensed. In electrical weighing systems, a load cell and electrical circuit may be used for setting the counter.

It should be clearly understood, however, that in all these cases a material identifying check means is associated with the material and must be properly coupled to the dispensing device in order to enable the dispensing of material, and that signalling means are employed to transmit data indicating the material dispensed as obtained from such a check means and the amount of material dispensed as available from the dispensing device are transmitted to a computer adapted to receive such information for the purpose of inventory control. As is well understood, the computer is adapted to maintain information with respect to a large quantity of items, locations, etc. and is adapted to consolidate inventories, provide reordering data, tabulate sales and maintain control over the available inventory.

While there has been described and illustrated a preferred embodiment of my invention and certain modifications have been indicated, it will be apparent to those skilled in the art that various further changes and modifications may be made without departing from the spirit and scope of the present invention.

What is claimed is:
1. An inventory system for use with dispensable material from bulk, comprising:
   dispensing means adapted to be operated for causing dispensing of material from bulk;

check receiving means associated with said dispensing means and adapted to receive a check provided with first indicia;

interlock means coupled to said dispensing means and said check receiving means for precluding operation of said dispensing means in the absence of the receipt of a check by said check receiving means;

counter means coupled to said dispensing means for providing second indicia responsive to the quantity of material dispensed during a particular dispensing operation;

sensing means disposed for sensing said first and said second indicia, and control means, including means operable for denoting the termination of a particular dispensing operation, coupled to said check receiving means and said sensing means for causing, responsive to the operation of said means denoting such termination, said sensing means to communicate data commensurate with said first and said second indicia to a remote location.

2. An inventory system as set forth in claim 1, and computing means disposed at said remote location and coupled to receive said data for maintaining an inventory of such material.

3. An inventory system as set forth in claim 2, said check receiving means adapted to receive a check in the form of a card, said first indicia being selected to identify the material dispensed.

4. An inventory system as set forth in claim 3, said dispensing means including means for engaging the material dispensed and being operated by the material during dispensing thereof.

5. An inventory system as set forth in claim 4, said means for engaging the material comprising at least one roller.

6. An inventory system as set forth in claim 2, said counter means including an analog to digital converter, and said second indicia being available from a digital means of said converter.

7. An inventory system as set forth in claim 6 and including means for zeroizing said counter means subsequent to said data having been communicated.

8. An inventory system as set forth in claim 2, said check receiving means adapted to receive a check having indicia whose placement on the check denotes a numeral.

9. An inventory system as set forth in claim 2, said sensing means comprising a first sensing means associated with said check receiving means for sensing the first indicia provided on a check when such check is engaged by said check receiving means, and a second sensing means disposed to sense the second indicia provided by said counter means.

10. An inventory system as set forth in claim 2, said check receiving means having means for retaining such check, means for releasing and ejecting such check responsive to a signal provided at the termination of a particular dispensing operation.

11. An inventory system for use with dispensable material from bulk, comprising:

dispensing means, including an element operated responsive to the quantity of material dispensed, adapted to cause dispensing of material from bulk;

check receiving means associated with said dispensing means and adapted to receive a check provided with first indicia identifying the material to be dispensed;

counter means coupled to said element for providing second indicia responsive to the operation thereof, whereby to indicate the quantity of material dispensed during a particular dispensing operation;

interlock means coupled to said dispensing means and to said element for precluding operation of said element in the absence of a check being disposed in said check receiving means;

means for maintaining said check engaged by said check receiving means during material dispensing and for releasing such check at the termination of a dispensing operation;

sensing means for sensing said first and said second indicia;

control means, including means operable for denoting the termination of a particular dispensing operation, coupled to said means for releasing and said sensing means for causing, responsive to the operation of said means denoting such termination, said sensing means to provide electrical signals commensurate with said first and said second indicia, and electronic computing means coupled for receiving said electrical signals and adapted to process such signals.

References Cited

UNITED STATES PATENTS 2,902,767  9/1959  Simjian.

HARRY N. HAROIAN, Primary Examiner